United States Patent
Dlugoss et al.

(10) Patent No.: US 9,102,315 B2
(45) Date of Patent: Aug. 11, 2015

(54) SLIP-BASED RELEASE VERIFICATION FOR A BINARY CLUTCH ASSEMBLY

(71) Applicant: GM GLOBAL TECHNOLOGY OPERATIONS LLC, Detroit, MI (US)

(72) Inventors: Randall B. Dlugoss, Royal Oak, MI (US); Vijay A. Neelakantan, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 73 days.

(21) Appl. No.: 14/094,108

(22) Filed: Dec. 2, 2013

(65) Prior Publication Data
US 2015/0151733 A1  Jun. 4, 2015

(51) Int. Cl.
*B60W 10/02* (2006.01)
*B60W 10/11* (2012.01)

(52) U.S. Cl.
CPC ............... *B60W 10/11* (2013.01); *B60W 10/02* (2013.01)

(58) Field of Classification Search
None
See application file for complete search history.

(56) References Cited

U.S. PATENT DOCUMENTS

| | | | |
|---|---|---|---|
| 2009/0111643 A1* | 4/2009 | Sah et al. | 477/5 |
| 2009/0118936 A1* | 5/2009 | Heap et al. | 701/54 |
| 2011/0184613 A1* | 7/2011 | Fujii et al. | 701/54 |

* cited by examiner

*Primary Examiner* — Justin Holmes
(74) *Attorney, Agent, or Firm* — Quinn Law Group, PLLC

(57) ABSTRACT

A vehicle includes an engine and transmission assembly, the latter having a stationary member, a plurality of gear sets, an input member, a friction clutch, a binary clutch assembly, and a transmission control module (TCM). The binary clutch assembly includes a freewheeling element and a binary device such as a selectable one way clutch or dog clutch. The TCM selectively delays a release of the binary clutch assembly via a binary clutch indicator method by detecting a requested shift of the transmission requiring an engagement of the friction clutch, and commanding the release of the binary clutch assembly. The TCM determines an amount of slip across the binary clutch assembly and executes the requested shift of the transmission only when the determined amount of slip exceeds a calibrated slip threshold. Slip may be measured or calculated.

18 Claims, 3 Drawing Sheets

SLIP-BASED RELEASE VERIFICATION FOR A BINARY CLUTCH ASSEMBLY

TECHNICAL FIELD

The present disclosure relates to slip-based release verification for a binary clutch assembly.

BACKGROUND

In a motor vehicle transmission, rotatable transmission input and output members are selectively coupled using interconnected gear elements and clutches to establish a range of transmission output speed ratios. Some clutches are usually embodied as fluid-actuated friction clutches having spaced clutch plates coated with friction material. A hydraulic piston may be used to compress the plates and thereby transfer torque across the engaged friction clutch, or to connect a rotating member to a stationary member in the manner of a brake. Friction clutches are typically controlled with a variable rate of slip such that the clutch state can range anywhere between fully-applied and fully-released.

In some transmissions, a binary clutch assembly is used in lieu of a friction clutch. A typical binary clutch assembly includes a freewheeling element and an on/off binary device such as a selectable one-way clutch or a dog clutch. Unlike conventional friction clutches, a binary device has just two possible clutch states, i.e., fully-applied and fully-released. When the binary device is unloaded upon a commanded release, the binary clutch assembly freewheels in at least one rotational direction. Application of the binary device, typically via deployment of spring-loaded struts, sprags, or other torque-holding pieces into engagement with recesses in a race of the binary device, thus effectively locks the binary clutch assembly to thereby present undesired rotation.

SUMMARY

A vehicle is disclosed herein that includes a transmission assembly having a binary clutch assembly of the type noted above. The transmission assembly receives input torque from an engine or another prime mover, and includes one or more gear sets, at least two gear elements or nodes of which are connected to each other via the binary clutch assembly. The binary clutch assembly may be any torque transfer device having only two clutch states: fully-applied and fully-released, i.e., characterized by an absence of any partially-applied clutch states.

A transmission control module (TCM) is in communication with the binary clutch assembly, and also with an engine control module (ECM) in some embodiments. The TCM executes a method for verifying that the binary clutch assembly has actually released after the TCM commands such a release. The TCM also controls the timing of an engagement of a friction clutch after commanding release of the binary clutch assembly, including engaging the friction clutch only when release of the binary clutch assembly has been verified by the TCM.

Execution of instructions embodying the present method causes the TCM, in response to a requested shift of the transmission assembly, to determine an amount of slip across the binary clutch assembly within a particular window of time after receiving the request. As part of the method, the TCM monitors the amount of slip across the binary clutch assembly, e.g., via receipt and processing of speed signals from a pair of speed sensors positioned with respect to the binary clutch assembly.

If the determined amount of slip does not change by a calibrated threshold slip under specified conditions, such as within a predetermined duration after a requested engine acceleration event used to help unload the binary clutch assembly, the TCM determines that the binary clutch assembly did not release as expected. Likewise, the binary clutch assembly is verified as having been released if the monitored slip changes by at least the calibrated threshold slip. The TCM may delay execution of the requested shift until the determined amount of slip exceeds the calibrated threshold slip, and then may proceed to the next sequence of transmission control without perceptible disturbances or noise, vibration, and harshness (NVH).

In particular, a vehicle in an example embodiment includes an engine and a transmission assembly. The transmission assembly includes a stationary member, multiple gear sets, and an input member that is continuously connected to the engine and to one of the gear sets. The vehicle in this embodiment also includes a friction clutch, a binary clutch assembly, and a TCM. The friction clutch selectively connects an element of one of the gear sets to the stationary member, or alternatively to an element of another of the gear sets. The binary clutch assembly has a fixed one-way clutch which always holds torque only in a first rotational direction and a binary device that, when engaged, prevents rotation of the binary clutch assembly in a second rotational direction. Thus, application of the binary device effectively locks the binary clutch assembly in two rotational directions.

The TCM, which is in communication with the binary clutch assembly, includes a processor and memory on which is recorded instructions for selectively delaying a release of the binary clutch assembly. Execution of the instructions from the memory via the processor causes the TCM to detect a requested shift of the transmission requiring engagement of the friction clutch, command the release of the binary device in response to the detected requested shift, determine an amount of slip across binary clutch assembly, and execute the requested shift of the transmission only when the determined amount of slip exceeds a calibrated threshold slip.

A transmission assembly as noted above is also disclosed herein, along with an associated binary clutch release verification method. The method in an example embodiment includes detecting, via the TCM, a requested shift of the transmission requiring an engagement of the friction clutch while the vehicle is coasting in first gear, and then commanding a release of a binary clutch assembly in response to the detected requested shift. The method also includes determining an amount of slip across the binary clutch assembly, and executing the requested shift of the transmission only when the determined amount of slip exceeds a calibrated threshold slip, thereby verifying the release of the binary clutch assembly. Executing the shift may include engaging the friction clutch to connect an element of one of the gear sets to the stationary member or to an element of another of the gear sets.

The above features and the advantages of the present disclosure are readily apparent from the following detailed description of the best modes for carrying out the invention when taken in connection with the accompanying drawings.

DETAILED DESCRIPTION

Figure 1:
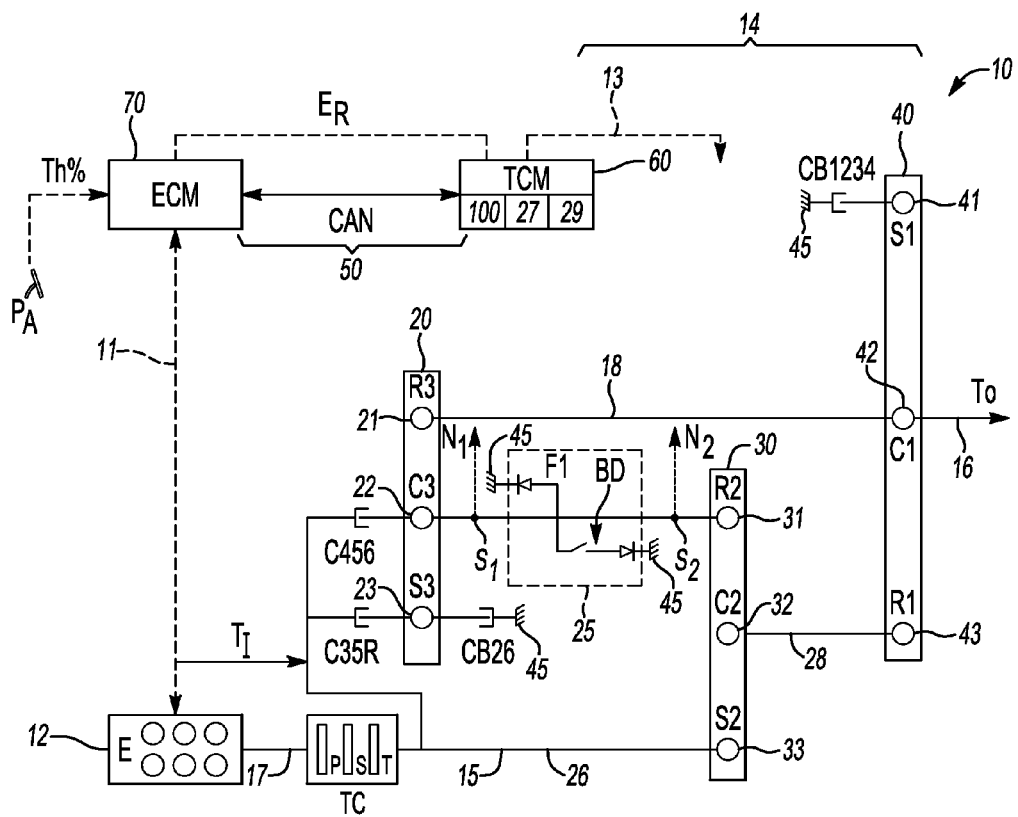
FIG. 1 is a schematic illustration of an example vehicle having an automatic transmission with a binary clutch assembly and a controller configured to verify proper release of the binary clutch assembly as described herein.

Referring to the drawings, an example vehicle 10 is shown schematically in FIG. 1. The vehicle 10 includes an internal combustion engine (E) 12 or other prime mover, and an automatic transmission 14 having a binary clutch assembly 25. The transmission 14 is shown in schematic lever diagram form. The vehicle 10 also includes a control system 50 having a transmission control module (TCM) 60 and an engine control module (ECM) 70, the latter of which is responsive to engine speed requests (arrow $E_R$) from the TCM 60. The control system 50 is configured, i.e., programmed in software and equipped in hardware, to determine whether the binary clutch assembly 25 has actually released after the TCM 60 first commands such a release.

This condition may occur when the transmission 14 is in a forward drive state, e.g., $1^{st}$ gear locked, and the vehicle 10 is coasting down a hill. In this state, the binary clutch assembly 25 is locked and thus holds torque in one rotational direction against its reverse struts or sprags (not shown). If the TCM 60 attempts to turn off the binary clutch assembly 25 in this operating state, the binary clutch assembly 25 of FIG. 1, in spite of its "released" logical state, may not be unloaded immediately due to torsional loads and friction acting on the binary clutch assembly 25.

That is, most binary clutch assembly designs use spring-loaded struts, sprags, or other torque-holding elements. In some states, the forces acting on a binary clutch assembly, even if release is commanded, exceed the spring force holding the struts or sprags in an engaged position. Thus, friction and other forces acting on the binary clutch assembly 25 of FIG. 1 may work to maintain the binary clutch assembly 25 in an engaged state in spite of a request by the TCM 60 to release. Absent execution of the present method 100, the TCM 60 may not recognize that the commanded release has not yet occurred. The method 100 therefore also provides verification of the release, as well as enables default control action in the overall shift control strategy of the TCM 60.

When release of the binary clutch assembly 25 is required to establish a given drive mode, the TCM 60 of FIG. 1 may request such a release. This request may be followed by a request from the TCM 60 to the ECM 70 for a temporary increase in engine speed. The burst of engine speed may help unload the released binary clutch assembly 25, i.e., to cause application of a torque that is opposite in direction to the torque that is loading the binary clutch assembly 25 during the coasting maneuver. However, it is recognized herein that the presence of the release request alone does not prove that the binary clutch assembly 25 has actually unloaded. That is, the binary clutch assembly 25 of FIG. 1 could still be engaged or holding torque.

Figure 2:
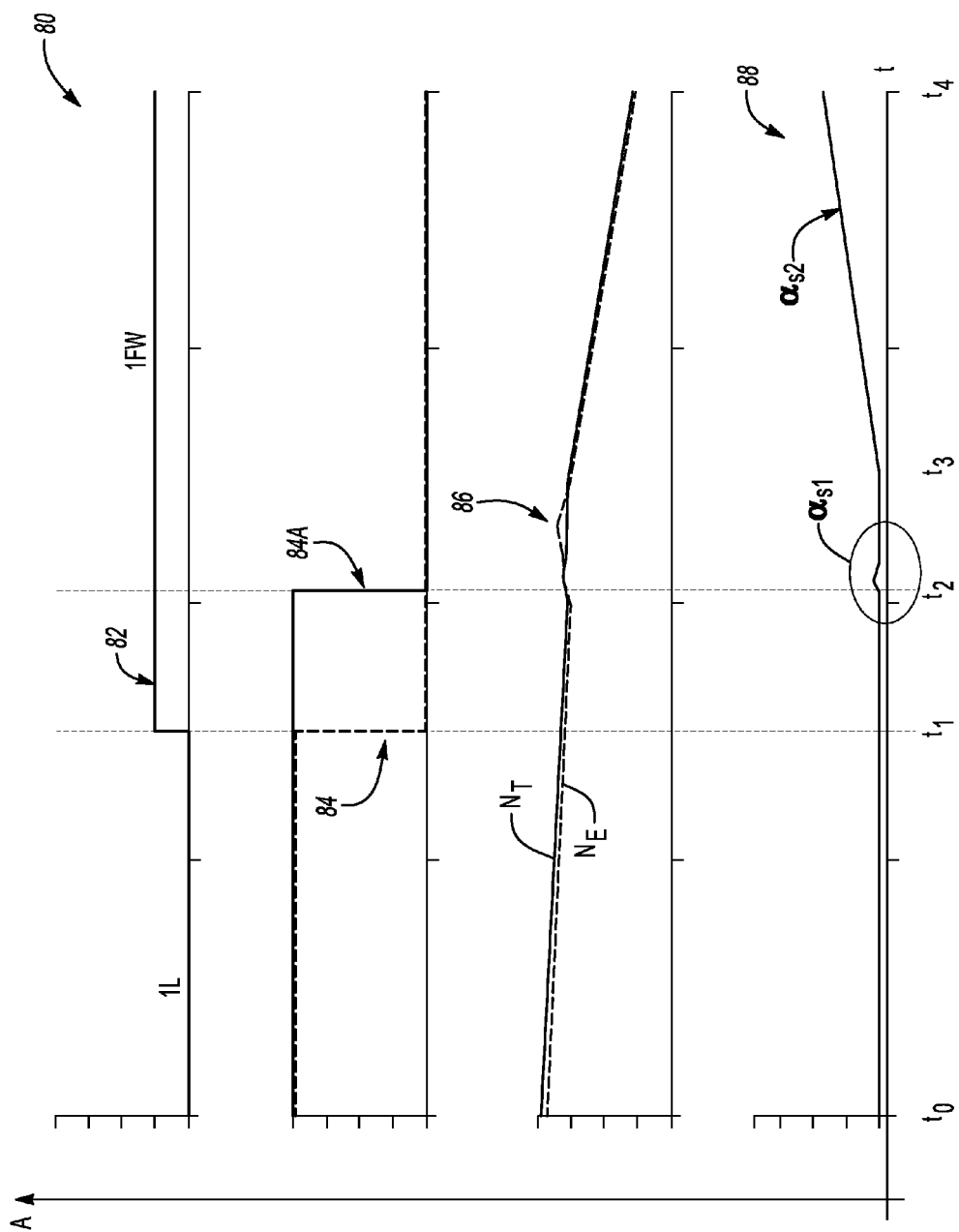
FIG. 2 is a set of time plots for vehicle parameters collectively describing a method for verifying the release of a binary clutch assembly such as that which is shown in FIG. 1.
Figure 3:
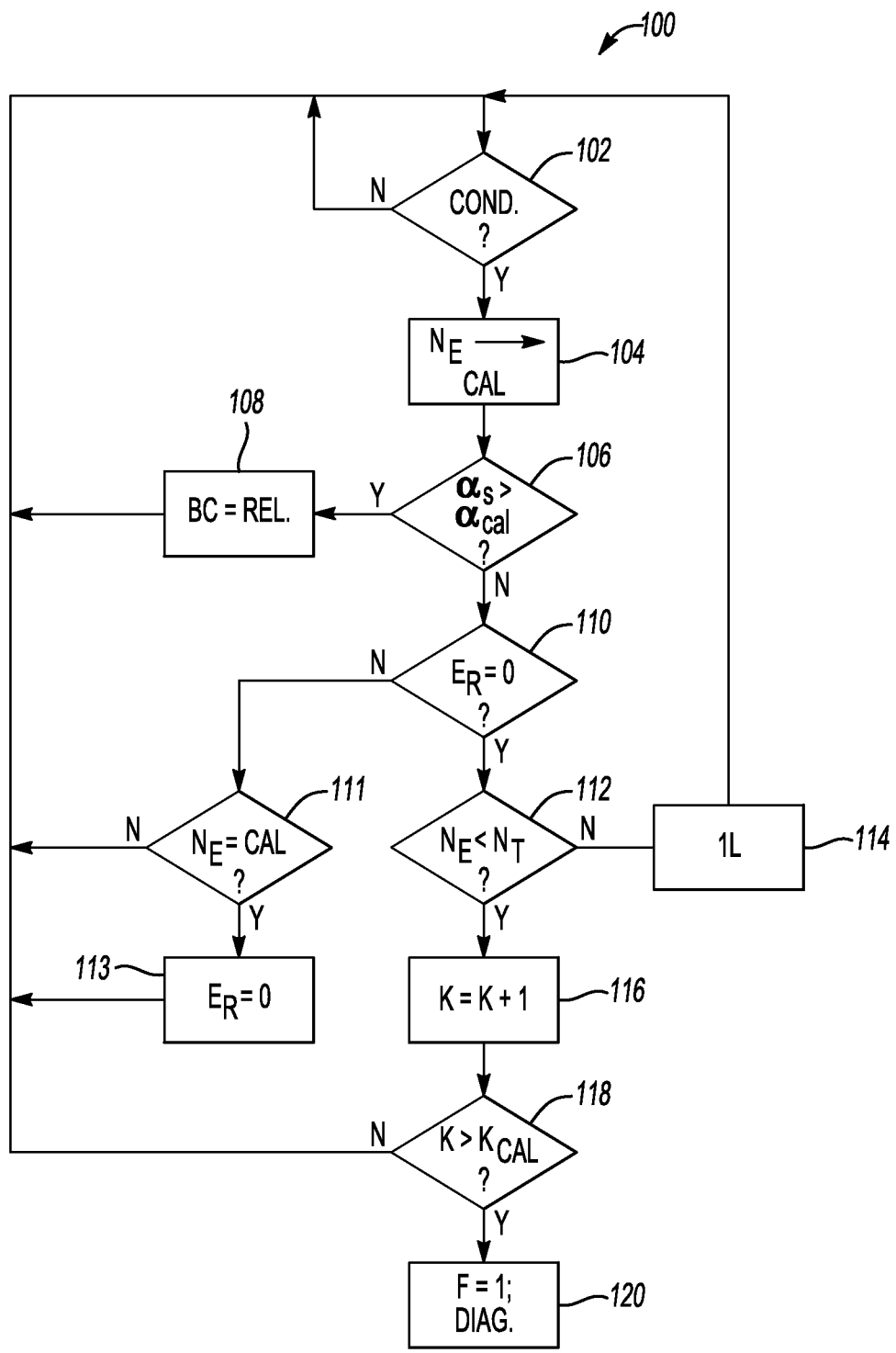
FIG. 3 is a flow chart for an example binary clutch assembly release verification method.

Execution of the present method 100 as described below with reference to FIGS. 2 and 3 is intended to provide a positive indicator that a load on the binary clutch assembly 25 has or has not yet been removed. The TCM 60 can then use this information in a variety of ways, including changing the timing of a shift, for instance by executing a shift earlier than it ordinarily would absent the method 100. That is, the TCM 60 could shift to $2^{nd}$ gear without waiting for an engine speed request to achieve a threshold engine speed as in existing systems. Likewise, in the rare instance that the binary clutch assembly 25 does not release when required, a default control action may be executed by the TCM 60 such as recording a diagnostic code and/or executing a default transmission operating mode in which the shift is not executed.

The method 100 disclosed herein may be used with the example transmission 14 of FIG. 1 as well as with other transmission designs using a binary clutch assembly similar to the binary clutch assembly 25 of FIG. 1, for instance selectable one-way clutches, dog clutches, and the like. At least two gear elements or nodes of the transmission 14 are selectively connected to each other via the binary clutch assembly 25, which otherwise may vary from the example configuration shown in FIG. 1.

The TCM 60 and the ECM 70 of FIG. 1 may be embodied as digital computer devices, and may communicate with each other over a controller area network (CAN) bus or other suitable network. Structurally, the TCM 60 may include a processor 27 along with sufficient tangible, non-transitory memory 29, e.g., read-only memory (ROM), flash memory, optical memory, additional magnetic memory, etc. The TCM 60 may also include any required random access memory (RAM), electrically-programmable read only memory (EPROM), a high-speed clock, analog-to-digital (A/D) and/or digital-to-analog (D/A) circuitry, and any input/output circuitry or devices, as well as any appropriate signal conditioning and buffer circuitry.

Instructions for executing the method 100 are recorded in the memory 29 and executed as needed via the processor(s) 27, with the TCM 60 ultimately outputting binary clutch control signals (arrow 13) to the transmission 14 and engine speed requests, indicated as $E_R$, to the ECM 70. Although omitted for simplicity from FIG. 1, the ECM 70 may include similar hardware components as the TCM 60. The ECM 70 may also receive a throttle request (Th %) from an accelerator pedal ($P_A$) as shown, and thus the ECM 70 remains in control of typical engine functions via a set of engine control signals (arrow 11), as is well understood in the art.

The example transmission 14 of FIG. 1 may include a hydrodynamic torque converter (TC) having a pump (P), stator (S), and turbine (T) of the type known in the art. The turbine (T) is connected to an input member 15 carrying input torque (arrow $T_I$) from the engine 12, via a driveshaft 17, into the transmission 14, and an output member 16 carrying output torque ($T_O$) from the transmission 14 to the drive wheels (not shown). The respective input and output members 15 and 16 are selectively connected to each other at a desired speed ratio via one or more gear sets, with the driveshaft 17 rotating at engine speed ($N_E$) and the input member 15 rotating at turbine speed ($N_T$).

In the non-limiting example embodiment of FIG. 1, the transmission 14 is shown as an example 6-speed automatic transmission having three planetary gear sets, i.e., a first gear set 20, a second gear set 30, and a third gear set 40. However, as noted above other configurations may be used without departing from the intended inventive scope. The first gear set 20 may include first, second, and third nodes 21, 22, and 23, respectively. The nodes 21, 22, and 23 may be optionally embodied as a ring gear (R3), a carrier member (C3), and sun gear (S3). The second and third gear sets 30 and 40 may likewise have respective first, second, and third nodes. For the second gear set 30, the first, second, and third nodes are nodes 31, 32, and 33, respectively, which may be a ring gear (R2), a carrier member (C2), and a sun gear (S2) in one embodiment. The third gear set 40 includes respective first, second, and third nodes 41, 42, and 43, e.g., a sun gear (S1), a carrier member (C1), and a ring gear (R1).

With respect to the first gear set 20, the first node 21 is continuously connected to the second node 42 of the third gear set 40 via an interconnecting member 18. The second node 22 is selectively connected to the engine 12 and the input member 15 via a first rotating clutch C456, e.g., a hydraulically-actuated friction plate clutch. Likewise, the third node 23 is selectively connected to the engine 12 and the input member 15 via a second rotating clutch C35R. The third node 23 is selectively connected to a stationary member 45 of the transmission via a first braking clutch CB26. As used herein for all clutches, the letter "C" refers to "clutch", "B" refers to "brake", and the various numbers refer to the particular forward drive gear modes, e.g., "R" is reverse, "1" is $1^{st}$ gear, "2" represents $2^{nd}$ gear, etc., all the way up to $6^{th}$ gear. The absence of a "B" in the clutch designation indicates that the particular clutch is a rotating clutch.

In the second gear set 30 of FIG. 1, the first node 31 is selectively connected to the second node 22 of the first gear set 20 via the binary clutch assembly 25. The binary clutch assembly 25 includes a freewheeling element F1 and an on/off binary device (BD), e.g., a selectable one-way clutch (SOWC) or a dog clutch. The freewheeling element F1 and the binary device (BD) selectively connect to a stationary member 45 of the transmission 14. Engagement of the binary device (BD) of the binary clutch assembly 25 locks nodes 22 and 31 to the stationary member 45. The second node 32 is continuously connected to the third node 43 of the third gear set 40 via another interconnecting member 28. The third node 33 is continuously connected to the input member 15 via another interconnecting member 26. The first node 41 of the third gear set 40 is selectively connected to the stationary member 45 via a second braking clutch CB1234.

The vehicle 10 of FIG. 1 may use the binary clutch assembly 25 when shifting to a reverse gear state, e.g., during a rolling garage shift as that term is known in the art, as well as when shifting from $1^{st}$ gear to $2^{nd}$ gear. The binary clutch assembly 25 is typically in an off/released state and thus freewheeling in one rotational direction in all gear states above $2^{nd}$ gear in order to reduce slip losses in these higher gears. As noted above, the example binary clutch assembly 25 may have two parts as shown in FIG. 1: the passive one-way clutch or a freewheeling element F1, which allows rotation in one rotational direction of the node connected to it, such as node 31 of the second gear set 30, and the SOWC or binary device (BD). The binary device (BD) is selectively applied to prevent rotation of the binary clutch assembly 25 in both rotational directions, but can also prevent rotation in one rotational direction. Hence, by applying the binary device (BD), any nodes connected to the binary device (BD) are effectively grounded to the stationary member 45.

Speed sensors $S_1$ and $S_2$ may be positioned with respect to the binary clutch assembly 25 as shown to measure respective rotational speeds $N_1$, $N_2$ on either side of the binary clutch assembly 25. These speeds $N_1$, $N_2$ are transmitted to the TCM 60, where slip speed is calculated as the difference between the speeds, i.e., $N_1-N_2$. Alternatively, transmission input speed and output speed sensors (not shown) may be used, with the slip speed calculated using known gear ratios, as is known in the art. That is, by knowing the particular relationship between the gear sets 20, 30, and 40, the speeds of the nodes may be determined from known input speed from the engine 12 and the known clutch states. Note that any multiple speed sensors or multiple locations of the same may be used in such a way to determine slip differential across the binary device (BD). Therefore, the examples provided herein are intended to be illustrative of one possible approach.

Referring to FIG. 2, the method 100 is intended to be used to continuously monitor a level of slip occurring across the binary device (BD) of the binary clutch assembly 25 shown in FIG. 1 at a certain time, specifically while the vehicle 10 is coasting and the transmission 14 is in a forward $1^{st}$ gear drive state. Traces 80 represent time plots for vehicle parameters collectively describing a release indicator or verification method for the binary clutch assembly 25 of FIG. 1. Trace 82 represents the present requested gear state. Between $t_0$ and $t_1$, the transmission 14 of FIG. 1 is in an example state of $1^{st}$ gear locked (1L). While coasting in this state, the TCM 60 receives a request for a shift requiring release of the binary device (BD) and engagement of a friction clutch, such as clutch CB1234, to establish a forward drive mode (1FW) at $t_1$. The TCM 60 maintains this command through $t_4$ in this example.

At $t_1$, the TCM 60 of FIG. 1 simultaneously requests release of the binary clutch assembly 25, which is indicated in FIG. 2 by trace 84. The binary clutch assembly 25 actually changes its internal logic state to "released" at $t_2$, as indicated by trace 84A, after some minimal processing delay. Trace 86 represents engine speed ($N_E$) and turbine speed ($N_T$). Traces 88 describe example occurrences of slip ($\alpha_{S1}$, $\alpha_{S2}$) across the binary clutch assembly 25 at different times, values the TCM 60 uses as part of the method 100 described below. After commanding a change of state at $t_1$, the TCM 60 may also request a temporary increase in engine speed ($N_E$) from the ECM 70 of FIG. 1 to help unload the binary clutch assembly 25. When engine speed (trace $N_E$) drops below turbine speed ($N_T$), which in FIG. 2 occurs at about $t_3$, slip across the binary clutch assembly 25, if properly released, should ramp up as shown in trace $\alpha_S$. Ordinarily, the TCM 60 would then proceed with a shift to the next gear, including engaging any friction clutches needed to establish the next gear. However, it is recognized herein that doing so absent verification of the actual release of the binary clutch assembly 25 may lead to a noise, vibration, and harshness (NVH) event or transmission tie up if the binary clutch assembly 25 has not in fact unloaded its torque load subsequent to the command to release.

The TCM 60 of FIG. 1 is therefore configured to monitor the amount of slip across the binary clutch assembly 25 as part of the method 100. The TCM 60 does so in a designated window of time, i.e., $t_1$-$t_3$, and detects whether a threshold amount of slip across the binary clutch assembly 25 is present in this interval. The calibrated threshold slip should be high enough to exceed any random or baseline low levels of slip due to hysteresis, lash, or signal noise, and therefore may be determined offline for a given vehicle 10 and stored in memory 29 of the TCM 60 of FIG. 1 as a calibrated or predetermined reference value.

Referring to FIG. 3, an example embodiment of the method 100 can be used to verify that the binary clutch assembly 25 of FIG. 1 has unloaded after its commanded release. In general, in response to a requested shift of the transmission 14, such as a tap shift from $1^{st}$ locked (1L) to $2^{nd}$ gear passing through $1^{st}$ gear forward drive, the binary device (BD) of FIG. 1 is commanded off by the TCM 60, and engine speed ($N_E$) is requested of the ECM 70 to a level slightly above that of turbine speed ($N_T$). The binary device (BD) should turn off, but this may be delayed somewhat, e.g., by about 50 ms.

Within a window of time before engine speed responds and imparts positive torque to the drive wheels, slip across the binary clutch assembly 25 may increase, which is an indication the binary device (BD) has disengaged and $2^{nd}$ gear can be commanded, with the engine speed request ($E_R$) removed. By monitoring slip in this window, the shift may be speeded up by several tenths of a second compared to conventional methods. If slip is not detected until after the engine speed request is removed, the method 100 can still shift the transmission 14 at that point. If slip is never detected, the binary device (BD) is considered to be locked, and other control actions may be taken by the TCM 60, including delaying or preventing execution of the shift.

The method 100 in an example embodiment begins with step 102, wherein the TCM 60 determines whether certain conditions (COND) are satisfied warranting continued execution of the method 100. Appropriate conditions may include standard transmission operation in $1^{st}$ gear locked, with receipt by the TCM 60 of a requested shift or tap-up command, e.g. by a driver of the vehicle 10 of FIG. 1 using conventional input devices such as throttle and brakes. If the conditions are present, the method 100 proceeds to step 104. The method 100 otherwise repeats step 102.

At step 104, the TCM 60 shown in FIG. 1 activates an engine speed request via the ECM 70 at the first initiation of method 100, i.e., an increase of engine speed by the ECM 70 to a calibrated (CAL) engine speed ($N_E$) needed for unloading/release of the binary clutch assembly 25. As the engine speed ($N_E$) increases, the method 100 proceeds to step 106.

Step 106 entails determining an amount of slip across the binary clutch assembly, i.e., $\alpha_S$, two examples of which are shown in FIG. 2 as slips $\alpha_{S1}$ and $\alpha_{S2}$. Various approaches for determining slip may be used, including calculating slip from the speed sensors $S_1$ and $S_2$ of FIG. 1 or deriving the slip using known gear ratios, the input speed from the engine, i.e., engine speed ($N_E$), etc. Step 106 further includes comparing the determined slip to a calibrated threshold slip, $\alpha_{CAL}$, to determine if the determined amount of slip exceeds the calibrated threshold slip. As noted above, the calibrated threshold slip should be set above the hysteresis level to avoid false positive decisions in which the binary clutch assembly 25 is not actually released. The method 100 proceeds to step 108 if the slip exceeds the calibrated threshold slip. Otherwise the method 100 proceeds to step 110.

At step 108, the TCM 60 confirms that the binary clutch assembly 25 of FIG. 1 has released (BC=REL.), and then executes a suitable control action, such as by allowing engagement of the next gear as originally requested at step 102.

At step 110, the method 100 determines whether the engine speed request is deactivated, i.e., $E_R=0$, meaning that the increase in engine speed by the ECM 70 initiated at step 104, so as to help unload the binary clutch assembly 25, has been cancelled. The method 100 proceeds to step 112 if the engine speed request is deactivated. The method 100 proceeds in the alternative to step 111.

Step 111 includes determining, via the TCM 60, that engine speed ($N_E$) equals the calibrated value (VAL), which as noted above in step 104 is a speed necessary to help unload the binary clutch assembly 25 of FIG. 1. If engine speed ($N_E$) has not yet reached the calibrated value, the method 100 returns to step 102. Otherwise, the method 100 proceeds to step 113.

At step 112, the TCM 60 determines whether engine speed is less than turbine speed, i.e., $N_E<N_T$. Alternatively, the same step could compare engine torque to turbine torque. The method 100 proceeds to step 116 if $N_E<N_T$. Otherwise, the method 100 proceeds to step 114.

Step 113 entails turning off or deactivating the engine speed request, i.e., $E_R=0$, and then returning to step 102. Note that on the next pass, assuming conditions from step 102 remain active, step 104 is not executed as engine speed ($N_E$) has already achieved the calibrated value (CAL).

Step 114 includes determining that $1^{st}$ gear is still locked and engine speed request remains off. The method 100 returns to step 102 if this determination is made. The expectation at this step is that the region of operation needed to detect that the binary device (BD) is off has not been achieved yet.

Step 116 entails initiating a counter (K=K+1). The method 100 then proceeds to step 118.

At step 118, the TCM 60 determines whether the counter of step 116 exceeds a calibrated value, i.e., $K>K_{CAL}$. The method 100 proceeds to step 120 when the counter (K) has reached the calibrated value ($K_{CAL}$). The method 100 returns to step 102 if the counter (K) has not yet reached the calibrated value.

At step 120, the TCM 60 may execute a control action indicating that the binary clutch assembly 25 of FIG. 1 did not unload when expected. For example, a diagnostic code (DIAG) or error flag may be set to 1 (F=1) indicating such a fault. The TCM 60 may, as a result of this flag, prevent execution of the shift requested at step 102. The method 100 returns to step 102.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   an engine; and
   a transmission assembly having:
   a stationary member;
   a plurality of gear sets;
   an input member that is continuously connected to the engine and to one of the plurality of gear sets;
   a friction clutch which selectively connects an element of one of the gear sets to the stationary member or to an element of another of the gear sets;
   a binary clutch assembly having a freewheeling element which holds torque only in a first rotational direction and a binary device that, when engaged, prevents rotation of the binary clutch assembly in a second rotational direction, and that allows the binary clutch assembly to freewheel in the second rotational direction opposite the first rotational direction when released; and
   a transmission control module (TCM) in communication with the binary clutch assembly, wherein the TCM includes a processor and memory on which is recorded instructions for selectively delaying a release of the binary clutch assembly, and wherein execution of the instructions from the memory via the processor causes the TCM to:
   detect a requested shift of the transmission requiring an engagement of the friction clutch;
   command the release of the binary clutch assembly in response to the detected requested shift;
   determine an amount of slip across the binary clutch assembly; and
   execute the requested shift of the transmission only when the determined amount of slip exceeds a calibrated slip threshold.

2. The vehicle of claim 1, further comprising an engine control module (ECM) that is in communication with the TCM, wherein the TCM is configured to transmit an engine speed request signal to the ECM to request a temporary increase in engine speed from the ECM in response to the requested shift to help unload the binary clutch assembly.

3. The vehicle of claim 2, further comprising a torque converter having a turbine, wherein the TCM is programmed to prevent the execution of the requested shift if the determined amount of slip does not exceed the calibrated slip threshold after the engine speed has decreased below turbine speed.

4. The vehicle of claim 1, wherein the requested shift is a shift from $1^{st}$ gear while the vehicle is coasting.

5. The vehicle of claim 1, further comprising first and second speed sensors positioned on different sides of the binary clutch assembly in communication with the TCM, wherein the TCM is configured to receive first and second speed measurements from the respective first and second speed sensors and calculate the amount of slip as a difference between the first and second speed measurements.

6. The vehicle of claim 1, wherein the binary device is a selectable one way clutch or a dog clutch.

7. The vehicle of claim 1, wherein the plurality of gear sets includes a first, second, and third gear set, wherein the binary clutch assembly selectively connects the first and second gear sets to each other, and the friction clutch selectively connects an element of the first or third gear set to the stationary member.

8. A transmission assembly for use in a vehicle having an engine, the transmission assembly comprising:
　a stationary member;
　a plurality of gear sets;
　an input member that is connectable to the engine and is continuously connected to one of the plurality of gear sets;
　a friction clutch which selectively connects an element of one of the gear sets to the stationary member or to an element of another of the gear sets;
　a binary clutch assembly having a freewheeling element which holds torque only in a first rotational direction and a binary device that, when engaged, prevents rotation of the binary clutch assembly in a second rotational direction, and that allows the binary clutch assembly to freewheel in the second rotational direction opposite the first rotational direction when released; and
　a transmission control module (TCM) in communication with the binary clutch assembly, wherein the TCM includes a processor and memory on which is recorded instructions for selectively delaying a release of the binary clutch assembly, and wherein execution of the instructions from the memory via the processor causes the TCM to:
　　detect a requested shift of the transmission requiring an engagement of the friction clutch;
　　command the release of the binary clutch assembly in response to the detected requested shift;
　　determine an amount of slip across the binary clutch assembly; and
　　execute the requested shift of the transmission only when the determined amount of slip exceeds a calibrated slip threshold.

9. The transmission assembly of claim 8, wherein the TCM is programmed to generate an engine speed request signal in response to the requested shift to help unload the binary clutch assembly.

10. The transmission assembly of claim 8, wherein the requested shift is a shift from $1^{st}$ gear while the vehicle is coasting.

11. The transmission assembly of claim 8, further comprising first and second speed sensors positioned on different sides of the binary clutch assembly in communication with the TCM, wherein the TCM is configured to receive first and second speed measurements from the respective first and second speed sensors and calculate the amount of slip as a difference between the first and second speed measurements.

12. The transmission assembly of claim 8, wherein the binary device is a selectable one way clutch or a dog clutch.

13. The transmission assembly of claim 8, wherein the plurality of gear sets includes a first, second, and third gear set, wherein the binary clutch assembly selectively connects the first and second gear sets to each other, and the friction clutch selectively connects an element of the first or third gear set to the stationary member.

14. A method for verifying the release of a binary clutch assembly in a vehicle which includes an engine and a transmission assembly, wherein the transmission assembly includes a stationary member, a plurality of gear sets, an input member, a friction clutch, a binary clutch assembly, and a transmission control module (TCM) in communication with the binary clutch assembly, the method comprising:
　detecting, via the TCM, a requested shift of the transmission requiring an engagement of the friction clutch while the vehicle is coasting in first gear;
　commanding a release of a binary clutch assembly in response to the detected requested shift, wherein the binary clutch assembly includes a freewheeling element which holds torque only in a first rotational direction and a binary device that is one of a selectable one way clutch and a dog clutch and that, when engaged, prevents rotation of the binary clutch assembly in a second rotational direction, and that allows the binary clutch assembly to freewheel in the second rotational direction opposite the first rotational direction when released;
　determining an amount of slip across the binary clutch assembly; and
　executing the requested shift of the transmission only when the determined amount of slip exceeds a calibrated slip threshold, thereby verifying the release of the binary clutch assembly, wherein executing the shift includes engaging the friction clutch to thereby connect an element of one of the gear sets to the stationary member or to an element of another of the gear sets.

15. The method of claim 14, wherein the vehicle includes an engine control module (ECM) in communication with the TCM, the method further comprising:
　requesting a temporary increase in engine speed from the ECM, via the TCM, in response to the requested shift to help unload the binary clutch assembly.

16. The method of claim 14, wherein the vehicle includes a torque converter having a turbine, further comprising: preventing the execution of the requested shift if the determined amount of slip does not exceed the calibrated slip threshold after the engine speed has decreased below turbine speed.

17. The method of claim 14, wherein the vehicle includes first and second speed sensors positioned on different sides of the binary clutch assembly in communication with the TCM, the method further comprising:
　receiving first and second speed measurements from the respective first and second speed sensors; and
　calculating the amount of slip as a difference between the first and second speed measurements.

18. The method of claim 14, wherein the plurality of gear sets includes a first, second, and third gear set, wherein the binary clutch assembly selectively connects the first and second gear sets to each other, and wherein engagement of the friction clutch includes connecting an element of the first or third gear set to the stationary member.

* * * * *